(12) United States Patent
Park et al.

(10) Patent No.: US 10,082,649 B2
(45) Date of Patent: Sep. 25, 2018

(54) REFLECTING IMAGING APPARATUS AND MOBILE DEVICE HAVING THE SAME

(71) Applicant: SAMSUNG ELECTRONICS CO., LTD., Suwon-si, Gyeonggi-do (KR)

(72) Inventors: Kyong-tae Park, Suwon-si (KR); Jong-chul Choi, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/181,775

(22) Filed: Jun. 14, 2016

(65) Prior Publication Data

US 2017/0131526 A1    May 11, 2017

(30) Foreign Application Priority Data

Nov. 9, 2015 (KR) .................. 10-2015-0156587

(51) Int. Cl.
| | |
|---|---|
| G02B 13/00 | (2006.01) |
| H04N 5/232 | (2006.01) |
| H04N 5/225 | (2006.01) |
| G03B 17/17 | (2006.01) |

(52) U.S. Cl.
CPC ......... *G02B 13/0065* (2013.01); *G03B 17/17* (2013.01); *H04N 5/2252* (2013.01); *H04N 5/2253* (2013.01); *H04N 5/2254* (2013.01); *H04N 5/2257* (2013.01); *H04N 5/23254* (2013.01); *H04N 5/23293* (2013.01)

(58) Field of Classification Search
CPC ............ G02B 13/0045; G02B 13/0055; G02B 13/006; G02B 13/0065; G02B 13/0075; H04N 5/23293; H04N 5/2257; H04N 5/2252; H04N 5/2254; G03B 17/02; G03B 17/17; H01L 27/14625
USPC ......................................... 348/340
See application file for complete search history.

(56) References Cited

U.S. PATENT DOCUMENTS

| | | | |
|---|---|---|---|
| 6,850,279 B1 * | 2/2005 | Scherling | G02B 13/0015 348/335 |
| 7,198,374 B2 | 4/2007 | Iechika et al. | |
| 7,382,546 B2 * | 6/2008 | Konno | G02B 13/003 359/678 |
| 8,120,693 B2 | 2/2012 | Nomura et al. | |

(Continued)

FOREIGN PATENT DOCUMENTS

| | | |
|---|---|---|
| JP | 2004-247887 | 9/2004 |
| JP | 2007-033819 | 2/2007 |

(Continued)

*Primary Examiner* — Pritham Prabhakher
(74) *Attorney, Agent, or Firm* — Nixon & Vanderhye P.C.

(57) ABSTRACT

A reflection type imaging apparatus includes a deflector that reflects light incident from an outside; a reflecting mirror that reflects the light reflected by the deflector in a direction parallel to a direction in which the light is incident on the deflector; an image sensor that is disposed below the reflecting mirror and arranged perpendicular to the direction in which the light is incident on the deflector, wherein the light reflected by the reflecting mirror is focused on the image sensor; and a stray light blocking member disposed at one side of the image sensor facing the deflector, the stray light blocking member configured to block stray light rays from the deflector from being directly incident on the image sensor.

14 Claims, 10 Drawing Sheets

(56) References Cited

U.S. PATENT DOCUMENTS

| | | | |
|---|---|---|---|
| 8,208,060 B2 * | 6/2012 | Lim | G02B 13/007 348/360 |
| 8,395,854 B2 * | 3/2013 | Takakubo | G02B 13/0065 359/726 |
| 8,427,761 B2 | 4/2013 | Yamada | |
| 8,570,668 B2 * | 10/2013 | Takakubo | G02B 13/0065 359/726 |
| 8,988,564 B2 | 3/2015 | Webster et al. | |
| 9,772,465 B2 * | 9/2017 | Osborne | G02B 7/004 |
| 2004/0095503 A1 * | 5/2004 | Iwasawa | G02B 13/004 348/344 |
| 2004/0109076 A1 * | 6/2004 | Yokota | H04N 5/2254 348/335 |
| 2006/0092524 A1 * | 5/2006 | Konno | G02B 13/003 359/678 |
| 2007/0024739 A1 * | 2/2007 | Konno | G02B 5/04 348/337 |
| 2008/0291543 A1 * | 11/2008 | Nomura | G02B 15/177 359/676 |
| 2009/0153726 A1 * | 6/2009 | Lim | G02B 13/007 348/360 |
| 2011/0181955 A1 | 7/2011 | Cho et al. | |
| 2012/0026384 A1 | 2/2012 | Yamada | |
| 2012/0075726 A1 * | 3/2012 | Takakubo | G02B 13/0065 359/726 |
| 2012/0075728 A1 | 3/2012 | Takakubo et al. | |
| 2012/0249815 A1 * | 10/2012 | Bohn | H04N 5/2254 348/208.99 |

FOREIGN PATENT DOCUMENTS

| | | |
|---|---|---|
| JP | 2012-068510 | 4/2012 |
| JP | 5482785 | 5/2014 |
| KR | 10-2012-0031435 | 4/2012 |
| KR | 10-1292693 | 8/2013 |

* cited by examiner

REFLECTING IMAGING APPARATUS AND MOBILE DEVICE HAVING THE SAME

CROSS-REFERENCE TO RELATED APPLICATIONS

This application is based on and claims priority under 35 U.S.C. § 119 to Korean Patent Application No. 10-2015-0156587 filed Nov. 9, 2015 in the Korean Intellectual Property Office, the disclosure of which is incorporated by reference herein in its entirety.

BACKGROUND

1. Field

The present disclosure relates to a reflecting imaging apparatus. For example, the present disclosure relates to a reflection type imaging apparatus a thickness of which can be reduced using a reflecting surface and a mobile device having the same.

2. Description of Related Art

Recently, various mobile devices such as smart phones, mobile phones, notebook computers, personal digital assistants (PDAs), personal multimedia players (PMPs), e-book terminals have been used in accordance with development of the electronic technology. It is very important to reduce the thickness the mobile device for portable convenience.

In general, these various mobile devices include an imaging apparatus such as a camera module to photograph an object. The size of the camera module is inevitably increased in order to obtain an image having a good quality. Accordingly, the thickness of the camera module acts as a constraint factor in reducing the thickness of the mobile device.

In order to solve this problem reflection type imaging apparatuses that turn an optical axis approximately 90 degrees using a deflector has been proposed.

FIG. 1 is a view illustrating a conventional reflection type imaging apparatus.

Referring to FIG. 1, the conventional reflection type imaging apparatus 100 has significantly reduced the height of the Z-axis direction by turning the optical axis by installing a deflector 101. Further, the height H of the reflection type imaging apparatus 100 is reduced by reducing the size of an image sensor 103.

In order to obtain a good image quality, the size of the image sensor should be larger. However, the conventional reflection type imaging apparatus 100 as illustrated in FIG. 1 is configured to use an optical splitter 105 and image sensors 103 capable of detecting each of the RGB colors so that the size of the image sensor 103 is reduced without loss of resolution.

The reflection type imaging apparatus of FIG. 1 can reduce the size of the image sensor 103 by using the optical splitter 105. However, the reflection type imaging apparatus 100 has a problem that the volume reduction effect of the reflection type imaging apparatus 100 is not great by reducing only the size of the image sensor 103.

In particular, in order to reduce the volume of the reflection type imaging apparatus, it is necessary to reduce the size of a printed circuit board on which the image sensor is disposed rather than the effective area of the image sensor for detecting optical signals. Accordingly, in the conventional reflection type imaging apparatus 100 as illustrated in FIG. 1 using the optical splitter 105 and three image sensors 103, since it is difficult to reduce of the size of the printed circuit board on which the three image sensors 103 are disposed, the volume reduction effect of the reflection type imaging apparatus 100 is not great. In addition, stray light may occur in the light corresponding to two colors of the light corresponding to three colors passing through the optical splitter.

SUMMARY

The present disclosure has been developed in order to address the above drawbacks and other problems associated with the conventional arrangement. An aspect of the present disclosure relates to a reflection type imaging apparatus which can reduce a vertical distance from an incident surface to an image sensor using a reflection surface, and a mobile device having the same.

In addition, another aspect of the present disclosure relates to a reflection type imaging apparatus that can reduce stray light that may occur in the reflection type imaging apparatus using a reflecting surface, and a mobile device having the same.

The above aspects and/or other features of the present disclosure may be substantially achieved by providing a reflection type imaging apparatus, which may include a deflector configured to reflect light incident from an outside; a reflecting mirror configured to reflect the light reflected by the deflector in a direction parallel to a direction in which the light is incident on the deflector; an image sensor that is disposed below the reflecting mirror perpendicular to the direction in which the light is incident on the deflector, wherein the light reflected by the reflecting mirror is focused on the image sensor; and a stray light blocking member disposed at a side of the image sensor facing the deflector, the stray light blocking member configured to block stray light rays from the deflector from being directly incident on the image sensor.

The stray light blocking member may be disposed in contact with a starting point of an effective area of the image sensor in a traveling direction of the light between the deflector and the reflecting mirror.

A height of the stray light blocking member may be determined by a height of an intersection point of a first optical path through which a light ray, which is reflected by a lower end of the deflector, is incident on the reflecting mirror, is reflected by the reflecting mirror, and reaches an end point of the effective area of the image sensor, passes; and a second optical path through which a light ray, which is reflected by a top end of the deflector, and is incident on the effective area of the image sensor without being incident on the reflecting mirror, passes.

The stray light blocking member may be disposed on a printed circuit board on which the image sensor is provided.

A light incident surface of the image sensor and a reflecting surface of the reflecting mirror may form an acute angle.

The effective area of the image sensor may be smaller than a projected area of the reflecting surface of the reflecting mirror.

The deflector may include one of a prism and a reflecting mirror.

According to another aspect of the present disclosure, a mobile device may include a display portion; a reflection type imaging apparatus that photographs an object; an image processing unit comprising an image processor configured to process an image of the object photographed by the reflection type imaging apparatus and to output the image to the display portion; and a case receiving the display portion, the reflection type imaging apparatus, and the image processing unit, wherein the reflection type imaging apparatus may include a deflector that reflects incident light; a reflecting mirror that reflects the light reflected by the deflector in a direction parallel to a direction in which the light is incident on the deflector; an image sensor that is disposed below the reflecting mirror and perpendicular to the direction in which the light is incident on the deflector, wherein the light reflected by the reflecting mirror is focused on the image sensor; and a stray light blocking member disposed at one side of the image sensor facing the deflector, the stray light blocking member configured to block stray light rays from the deflector from being directly incident on the image sensor.

The stray light blocking member may be disposed in contact with a starting point of an effective area of the image sensor in a traveling direction of the light between the deflector and the reflecting mirror.

A height of the stray light blocking member may be determined by a height of an intersection point of a first optical path through which a light ray, which is reflected by a lower end of the deflector, is incident on the reflecting mirror, is reflected by the reflecting mirror, and reaches an end point of the effective area of the image sensor, passes; and a second optical path through which a light ray, which is reflected by a top end of the deflector, and is incident on the effective area of the image sensor without being incident on the reflecting mirror, passes.

The stray light blocking member may be disposed on a printed circuit board on which the image sensor is provided.

The case may include an upper surface and a lower surface parallel to each other; the case including a through hole formed on the upper surface of the case through which light is incident on the deflector, wherein the printed circuit board is disposed on the lower surface of the case.

The case may include an upper surface and a lower surface parallel to each other; the case including a through hole formed on the upper surface of the case through which light is incident on the deflector, wherein the printed circuit board is disposed at a side of the through hole on the upper surface of the case.

The deflector may include one of a prism and a reflecting mirror.

Other objects, advantages and salient features of the present disclosure will become apparent from the following detailed description, which, taken in conjunction with the drawings, discloses preferred embodiments.

BRIEF DESCRIPTION OF THE DRAWINGS

These and/or other aspects and advantages of the present disclosure will become apparent and more readily appreciated from the following detailed description, taken in conjunction with the accompanying drawings, in which like reference numerals refer to like elements, and wherein.

Throughout the drawings, like reference numerals will be understood to refer to like parts, components and structures.

DETAILED DESCRIPTION

Hereinafter, certain example embodiments of the present disclosure will be described in greater detail with reference to the accompanying drawings.

The matters defined herein, such as a detailed construction and elements thereof, are provided to assist in a comprehensive understanding of this description. Thus, it is apparent that example embodiments may be carried out without those defined matters. Also, well-known functions or constructions may be omitted to provide a clear and concise description of example embodiments. Further, dimensions of various elements in the accompanying drawings may be arbitrarily increased or decreased for assisting in a comprehensive understanding.

The terms used in the description are only used to describe the example embodiments, and are not intended to limit the scope of the disclosure. The singular expression also includes the plural meaning as long as it does not conflict with the context. In the description, the terms "include" and "comprise" designate the presence of features, numbers, steps, operations, components, elements, or a combination thereof that are written in the description, but do not exclude the presence or possibility of addition of one or more other features, numbers, steps, operations, components, elements, or a combination thereof.

In the present disclosure, a "module" or a "unit" performs at least one function or operation, and may be implemented with hardware, firmware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Figure 1:
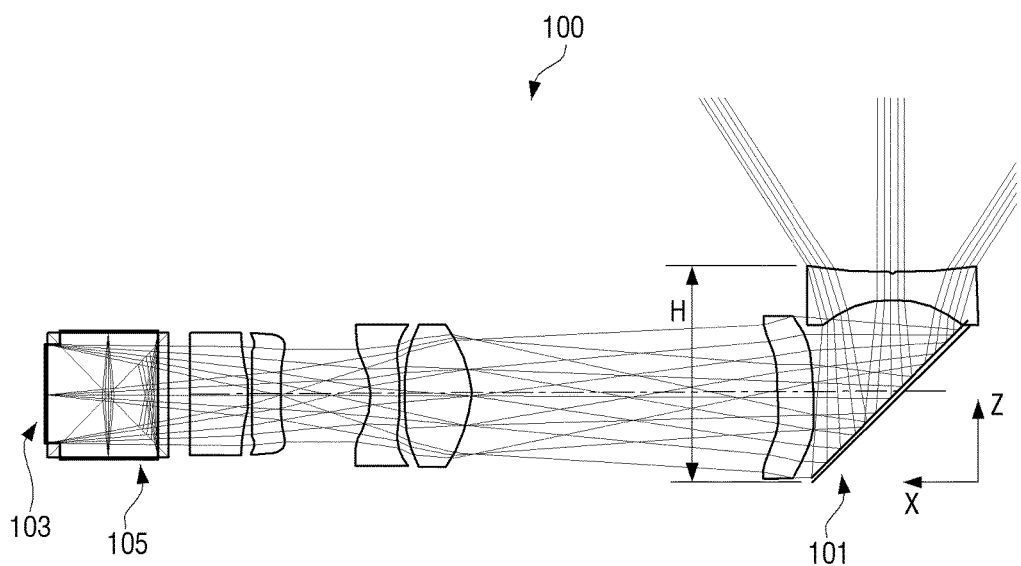
FIG. 1 is a diagram illustrating a conventional reflection type imaging apparatus.
Figure 2:
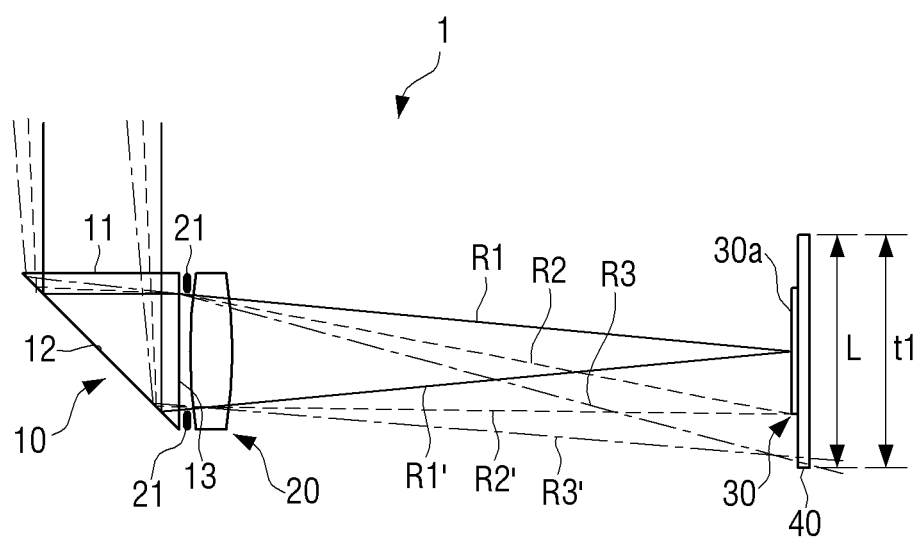
FIG. 2 is a diagram illustrating an example of a reflection type imaging apparatus in which stray light does not occur.

FIG. 2 is a diagram illustrating an example of a reflection type imaging apparatus in which stray light does not occur.

Referring to FIG. 2, a reflection type imaging apparatus 1 includes a deflector 10, a lens optical system 20, and an image sensor 30.

The deflector 10 deflects a path of light that is incident from the outside approximately 90 degrees, thereby reducing a thickness t1 of the reflection type imaging apparatus 1. The deflector 10 includes an incident surface 11 on which the light is incident, a reflecting surface 12 to reflect the light, and an emitting surface 13 to emit the light reflected from the reflecting surface 12 to the outside.

The lens optical system 20 causes the light emitted from the deflector 10 to be focused on the image sensor 30, and is provided between the deflector 10 and the image sensor 30. Although the lens optical system 20 includes only one lens in FIG. 2, which is for convenience of illustration, the lens optical system 20 may be configured to include two or more lenses. Further, an iris 21 for adjusting the quantity of light may be disposed between the lens optical system 20 and the deflector 10.

Figure 8:
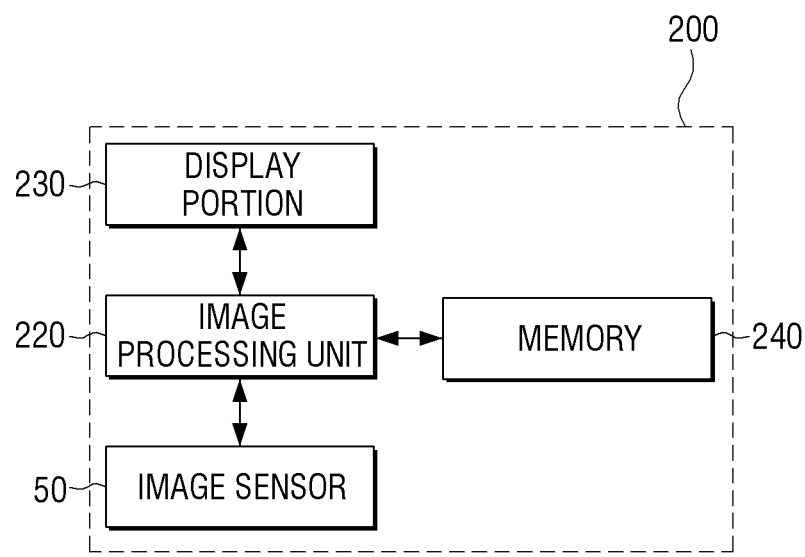
FIG. 8 is a functional block diagram illustrating an example of the mobile device of FIG. 7.

The image sensor 30 converts the light of an object that is focused through the lens optical system 20 into an electrical signal, and outputs the electrical signal to an image processing unit (e.g., including image processing circuitry) 220 (see FIG. 8). The image sensor 30 is disposed on a printed circuit board 40, and includes an effective area that actually converts the incident light into the electrical signal. The effective area is provided with a plurality of pixels. The image sensor 30 is disposed on a top surface of the printed circuit board 40, and is disposed so that a top surface of the image sensor 30, for example, a light incident surface 30a of the image sensor 30, is parallel to a direction of the light incident on the deflector 10. In other words, the light incident surface 30a of the image sensor 30 is disposed parallel to the emitting surface 13 of the deflector 10, and perpendicular to the incident surface 11 of the deflector 10. The image sensor 30 may be a complementary metal oxide semiconductor (CMOS) image sensor or a charge coupled device (CCD) image sensor, or the like.

External light within a predetermined angle of view is focused on the image sensor 30 through the deflector 10 and the lens optical system 20.

In FIG. 2, R1 indicates an uppermost ray of a light ray bundle to be focused at a center pixel of the image sensor 30, and R1' indicates a lowermost ray of the center light ray bundle. R2 indicates an uppermost ray of a light ray bundle to be focused at a lowermost pixel of the image sensor 30, and R2' indicates a lowermost ray of the lowermost light ray bundle. All of R1, R1', R2, and R2' are light rays within the designed angle of view, and incident on the effective area of the image sensor 30.

R3 indicates an uppermost ray of a light ray bundle to be focused beyond the effective area of the image sensor 30 below the image sensor 30, and R3' indicates a lowermost ray of the light ray bundle beyond the effective area of the image sensor 30. R3 and R3' are light rays beyond the designed angle of view, and are not incident on the effective area of the image sensor 30.

As illustrated in FIG. 2, when the image sensor 30 is arranged to be perpendicular to the incident surface 11 of the deflector 10, the light rays R3 and R3' beyond the designed angle of view cannot be directly incident on the image sensor 30. Accordingly, in the reflection type imaging apparatus 1 having the structure as illustrated in FIG. 2, stray light that affects the image quality does not occur. However, the height t1 of the reflection type imaging apparatus 1 as illustrated in FIG. 2 is determined by the size L of the printed circuit board 40 on which the image sensor 30 is disposed.

Accordingly, in order to reduce the height t1 of the reflection type imaging apparatus 1, it is required to reduce the size L of the printed circuit board 40. Since the size L of the printed circuit board 40 is determined by the size of the image sensor 30, it is required to reduce the size of the image sensor 30 in order to reduce the size L of the printed circuit board 40. However, reducing the size of image sensor 30 may lower or reduce resolution so that it is difficult to obtain a good image quality.

In order to address such a problem, a way to dispose the image sensor 30 in a direction parallel to the incident surface 11 of the deflector 10 may be considered.

Hereinafter, a reflection type imaging apparatus 1' in which an image sensor 50 is disposed parallel to the incident surface 11 of the deflector 10 will be described in greater detail with reference to FIG. 3.

Figure 3:
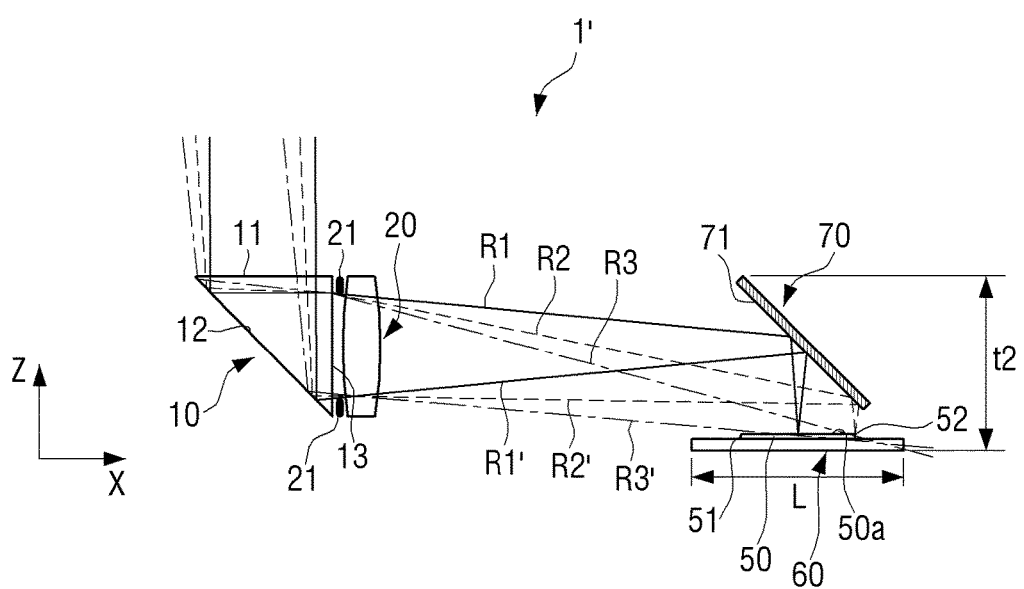
FIG. 3 is a diagram illustrating an example of a reflection type imaging apparatus that can reduce a thickness of a mobile device and in which stray light occurs.

FIG. 3 is a diagram illustrating an example of a reflection type imaging apparatus that can reduce a thickness of a mobile device.

Referring to FIG. 3, the reflection type imaging apparatus 1' includes a deflector 10, a lens optical system 20, a reflecting mirror 70, and an image sensor 50.

The deflector 10 and the lens optical system 20 are the same as those of the reflection type imaging apparatus 1 as illustrated in FIG. 2; therefore, detailed descriptions thereof are omitted here.

The reflecting mirror 70 is disposed to reflect the light that is reflected by the deflector 10, that passes through the lens optical system 20, and is incident on the reflecting mirror 70 in a direction substantially parallel to the direction (Z direction) in which the light is incident on the deflector 10. For example, the reflecting mirror 70 is disposed to reflect the light, which is emitted from the emitting surface 13 of the deflector 10 in a direction (X direction) approximately parallel to the image sensor 50, to the effective area of the image sensor 50.

The image sensor 50 converts the light of an object that is focused in the effective area through the lens optical system 20 into an electrical signal, and outputs the electrical signal to an image processing unit (e.g., including image processing circuitry) 220 (see FIG. 8). The image sensor 50 is disposed on a printed circuit board 60, and the effective area includes a plurality of pixels. The image sensor 50 is disposed on the top surface of the printed circuit board 60, and is perpendicular to a direction (Z direction) of the light incident on the deflector 10. For example, a light incident surface 50a of the image sensor 50 is disposed parallel to the incident surface 11 of the deflector 10 and perpendicular to the emitting surface 13 of the deflector 10. Accordingly, the light incident surface 50a of the image sensor 50 is disposed in a direction (X direction) approximately parallel to the light emitted from the emitting surface 13 of the deflector 10.

If the image sensor 50 is arranged as described above, the height t2 of the reflection type imaging apparatus 1' may be determined only by the deflector 10 and the lens optical system 20 without being affected by the size L of the printed circuit board 60 on which the image sensor 50 is disposed.

Further, the image sensor 50 is disposed below the reflecting mirror 70. The light incident surface 50a of the image sensor 50 and a reflecting surface 71 of the reflecting mirror 70 form an acute angle. At this time, the effective area of the image sensor 50 is formed to be smaller than the projected area of the reflecting surface 71 of the reflecting mirror 70. In order to reduce the height t2 of the reflection type imaging apparatus 1', the reflecting mirror 70 and the image sensor 50 may be disposed as close as possible. However, the reflecting mirror 70 and the image sensor 50 are disposed so that the light, which is reflected by the lower end of the deflector 10 and then incident on the reflecting mirror 70 in a direction parallel to the light incident surface 50a of the image sensor 50, is reflected by the lower end of the reflecting mirror 70, and then incident on the outermost pixel 52 of the image sensor 50. Here, the outermost pixel 52 of the image sensor 50 refers to a pixel which is farthest from the emitting surface 13 of the deflector 10 in a traveling direction (X direction) of the light emitted from the emitting surface 13 of the deflector 10 among the plurality of pixels of the image sensor 50.

External light rays within a predetermined angle of view are focused on the effective area of the image sensor 50 through the deflector 10, the lens optical system 20, and the reflecting mirror 70.

In FIG. 3, R1 indicates an uppermost ray of a light ray bundle to be focused at a center pixel of the image sensor 50, and R1' indicates a lowermost ray of the center light ray bundle. R2 indicates an uppermost ray of a light ray bundle to be focused at the outermost pixel 52 of the image sensor 50, and R2' indicates a lowermost ray of the outermost light ray bundle. All of R1, R1', R2, and R2' are light rays within the designed angle of view, and incident on the effective area of the image sensor 50.

R3 indicates an uppermost ray of a light ray bundle that is not incident on the reflecting mirror 70 and is directly incident on the outermost pixel 52 of the image sensor 50, and R3' indicates a lowermost ray of the light ray bundle. R3 and R3' are light rays beyond the designed angle of view, and is directly incident on the effective area of the image sensor 50 without being incident on the reflecting mirror 70. Thus, the light rays R3 and R3' that are beyond the designed angle of view and incident on the effective area of the image sensor 50 are referred to as stray light. Since the stray light overlaps with the normal light rays within the angle of view in the light incident surface 50a of the image sensor 50, the stray light can be a major cause of image degradation. Therefore, it is desirable to remove the stray light in order to obtain an image having a good image quality.

If the image sensor 50 is disposed parallel to the incident surface 11 of the deflector 10 as illustrated in FIG. 3, the height t2 of the reflection type imaging apparatus 1' may be reduced, but the light other than the designed angle of view, that is, the stray light R3 and R3' may be directly incident on the effective area of the image sensor 50 so that the image quality is degraded.

A reflection type imaging apparatus according to an example embodiment of the present disclosure having a structure for blocking the stray light will be described in greater detail with reference to FIG. 4.

Figure 4:
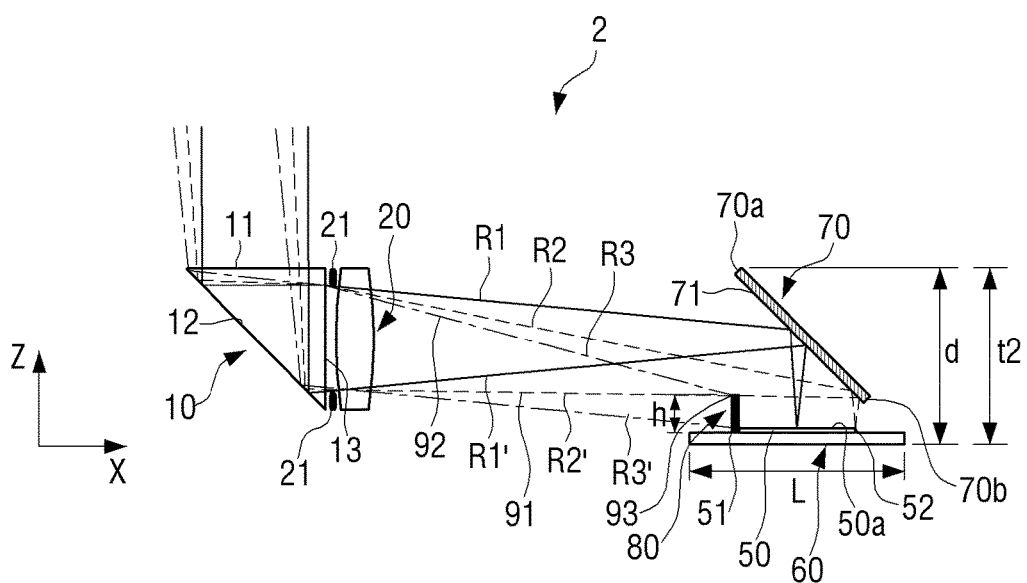
FIG. 4 is a diagram illustrating an example reflection type imaging apparatus according to an example embodiment of the present disclosure.

FIG. 4 is a diagram illustrating an example reflection type imaging apparatus according to an example embodiment of the present disclosure.

Referring to FIG. 4, a reflection type imaging apparatus 2 includes a deflector 10, a lens optical system 20, a reflecting mirror 70, an image sensor 50, and a stray light blocking member 80.

The deflector 10 is configured to deflect a path of light that is incident from the outside approximately 90 degrees. A prism or a reflecting mirror may be used as the deflector 10. The reflection type imaging apparatus 2 as illustrated in FIG. 4 is provided with a prism as the deflector 10. Accordingly, the deflector 10 includes an incident surface 11 on which light is incident, a reflecting surface 12 to reflect the light, and an emitting surface 13 to emit the light reflected by the reflecting surface 12 toward the outside.

The lens optical system 20 is disposed at a side of the emitting surface 13 of the deflector 10, and causes the light emitted from the deflector 10 to be reflected by the reflecting mirror 70 and to be focused on the image sensor 50. The lens optical system 20 is provided between the emitting surface 13 of the deflector 10 and the reflecting mirror 70. The lens optical system 20 as illustrated in FIG. 4 includes only one lens, but this is for convenience of illustration. The lens optical system 20 may be configured to include two or more lenses. Further, an iris 21 for adjusting the quantity of light may be disposed between the lens optical system 20 and the emitting surface 13 of the deflector 10.

The reflecting mirror 70 is formed to reflect the light, which is emitted from the emitting surface 13 of the deflector 10, passes through the lens optical system 20, and is incident on the reflecting mirror 70, to the image sensor 50. Since the image sensor 50 is disposed in a direction (X direction) perpendicular to the direction (Z direction) in which the light is incident on the deflector 10, the reflecting mirror 70 is disposed to reflect the incident light in a direction (Z direction) parallel to the emitting surface 13 of the deflector 10. In other words, the reflecting mirror 70 is disposed to reflect the light, which is emitted from the emitting surface 13 of the deflector 10 in a direction (X direction) approximately parallel to the image sensor 50, to the effective area of the image sensor 50.

The image sensor 50 converts the light of an object that is focused in the plurality of pixels of the effective area through the lens optical system 20 into an electrical signal, and outputs the electrical signal to an image processing unit (e.g., including image processing circuitry) 220 (see FIG. 8). The image sensor 50 is disposed on a printed circuit board 60. The top surface of the image sensor 50 which is disposed on the top surface of the printed circuit board 60, that is, the light incident surface 50a of the image sensor 50 is disposed in a direction (X direction) perpendicular to the direction (Z direction) of the light incident on the incident surface 11 of the deflector 10. In other words, the light incident surface 50a of the image sensor 50 is disposed parallel to the incident surface 11 of the deflector 10, and perpendicular to the emitting surface 13 of the deflector 10. Accordingly, the light incident surface 50a of the image sensor 50 is disposed in a direction (X direction) approximately parallel to the light emitted from the emitting surface 13 of the deflector 10. If the image sensor 50 is arranged in a way as described above, the height t2 of the reflection type imaging apparatus 2 may be determined by the deflector 10 and the lens optical system 20 without being affected by the size L of the printed circuit board 60 on which the image sensor 50 is disposed.

The image sensor 50 is disposed below the reflecting mirror 70. A reflecting surface 71 of the reflecting mirror 70 is disposed to form an acute angle with respect to the light incident surface 50a of the image sensor 50. At this time, the effective area of the image sensor 50 is formed to be smaller than the projected area of the reflecting surface 71 of the reflecting mirror 70.

In order to reduce the height t2 of the reflection type imaging apparatus 2, the distance d between the top end 70a of the reflecting mirror 70 and the bottom surface of the printed circuit board 60 on which the image sensor 50 is disposed may be as close as possible. For this purpose, the reflecting mirror 70 and the image sensor 50 may be disposed so that the angle between the reflecting mirror 70 and the light incident surface 50a of the image sensor 50 is as small as possible, and the distance between the bottom end 70b of the reflecting mirror 70 and the image sensor 50 is as closed as possible. However, the reflecting mirror 70 and the image sensor 50 may be disposed so that the light, which is reflected by the lower end of the deflector 10 and then incident on the reflecting mirror 70 in a direction parallel to the light incident surface 50a of the image sensor 50, is reflected by the lower end of the reflecting mirror 70, and then incident on the outermost pixel 52 of the image sensor 50. Here, the outermost pixel 52 of the image sensor 50 refers to a pixel which is farthest from the emitting surface 13 of the deflector 10 in a traveling direction (X direction) of the light emitted from the emitting surface 13 of the deflector 10 among the plurality of pixels of the image sensor 50.

The stray light blocking member 80 is formed to block light other than the designed angle of view from being directly incident on the effective area of the image sensor 50. For this, the stray light blocking member 80 is disposed at one side of the image sensor 50 facing the deflector 10. In particular, the stray light blocking member 80 is disposed at one side of the innermost pixel 51 of the image sensor 50. Here, the innermost pixel 51 of the image sensor 50 refers to a pixel which is closest to the emitting surface 13 of the deflector 10 in a traveling direction (X direction) of the light emitted from the emitting surface 13 of the deflector 10 among the plurality of pixels of the image sensor 50. Accordingly, the innermost pixel 51 is a starting point of the effective area of the image sensor 50 in the traveling direction of the light (X direction). Accordingly, the stray light blocking member 80 is disposed to be in contact with the starting point of the effective area of the image sensor 50 in the traveling direction (X direction) of the light emitted from the emitting surface 13 of the deflector 10.

Also, the stray light blocking member 80 may be formed in a substantially rectangular shape, and the bottom end of the stray light blocking member 80 may be fixed to the printed circuit board 60 on which the image sensor 50 is disposed. Alternatively, the stray light blocking member 80 may be formed integrally with the image sensor 50. In other words, the stray light blocking member 80 may be formed in a shape of projecting from one side of the image sensor 50.

The stray light blocking member 80 is formed to not block the light rays within the designed angle of view, and to block the light rays that are beyond the designed angle of view and directly incident on the effective area of the image sensor 50, that is, the stray light. For this, the stray light blocking member 80 is formed, for example, to have the same height as the height h of an intersection point 93 of a first optical path 91 through which the light ray R2', which is reflected by the lower end of the reflecting surface 12 of the deflector 10, is incident on the reflecting mirror 70, is reflected by the reflecting mirror 70, and reaches the end point 52 of the effective area of the image sensor 50, passes; and a second optical path 92 through which the light ray, which is reflected by the top end of the reflecting surface 12 of the deflector 10, and is directly incident on the effective area of the image sensor 50 without being incident on the reflecting mirror 70, passes. Also, the top end of the stray light blocking member 80 is disposed to match the intersection point 93.

Further, the stray light blocking member 80 may be formed to have the same width w as that of the image sensor 50. For example, as illustrated in FIG. 5, the stray light blocking member 80 has the same width w as the width of the image sensor 50, and may be disposed on the printed circuit board 60 at one side of the image sensor 50.

Figure 5:
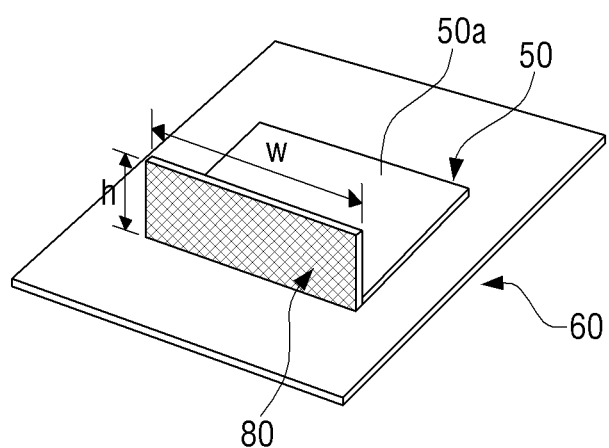
FIG. 5 is a perspective view conceptually illustrating a printed circuit board of the reflection type imaging apparatus of FIG. 4 on which an image sensor and an example stray light blocking member are disposed.

FIG. 5 is a perspective view conceptually illustrating a printed circuit board of the reflection type imaging apparatus of FIG. 4 on which an image sensor and a stray light blocking member are disposed. The printed circuit board 60 may be provided with an image processing unit capable of processing the electrical signals generated by the image sensor 50.

External light rays within a predetermined angle of view are focused on the effective area of the image sensor 50 through the deflector 10, the lens optical system 20, and the reflecting mirror 70.

In FIG. 4, R1 indicates an uppermost ray of a light ray bundle to be focused at a center pixel of the image sensor 50, and R1' indicates a lowermost ray of the center light ray bundle. R2 indicates an uppermost ray of a light ray bundle to be focused at the outermost pixel 52 of the image sensor 50, and R2' indicates a lowermost ray of the outermost light ray bundle. All of R1, R1', R2, and R2' are light rays within the designed angle of view, reflected by the reflecting mirror 70, and then incident on the effective area of the image sensor 50. In other words, since all light rays within the designed angle of view are reflected by the reflecting mirror 70 and then are incident on the image sensor 50, the light rays within the designed angle of view are not directly incident on the image sensor 50 without being reflected on the reflecting mirror 70.

R3 indicates an uppermost ray of a light ray bundle that is not incident on the reflecting mirror 70 and is directly incident on the outermost pixel 52 of the image sensor 50, and R3' indicates a lowermost ray of the light ray bundle. R3 and R3' are light rays beyond the designed angle of view, and are directly incident on the effective area of the image sensor 50 without being incident on the reflecting mirror 70. In other words, R3 and R3' are light rays beyond the designed angle of view, and are directly incident on the effective area of the image sensor 50 not the reflecting mirror 70, that is, stray light. However, in the case of the present disclosure, as illustrated in FIG. 4, the light rays R3 and R3' are blocked by the stray light blocking member 80, thereby not being incident on the image sensor 50. Accordingly, in the reflection type imaging apparatus 2 according to an example embodiment of the present disclosure, although the image sensor 50 is disposed perpendicular to the direction (Z direction) of the light that is incident on the deflector 10, image degradation due to the stray light may be prevented.

With the reflection type imaging apparatus 2 according to an example embodiment of the present disclosure, since the image sensor 50 can be disposed perpendicular to the direction of the light incident on the deflector 10, the thickness t2 of the reflection type imaging apparatus 2 may be reduced regardless of the size of the image sensor 50, and the image degradation due to the stray light may be prevented.

Figure 6:
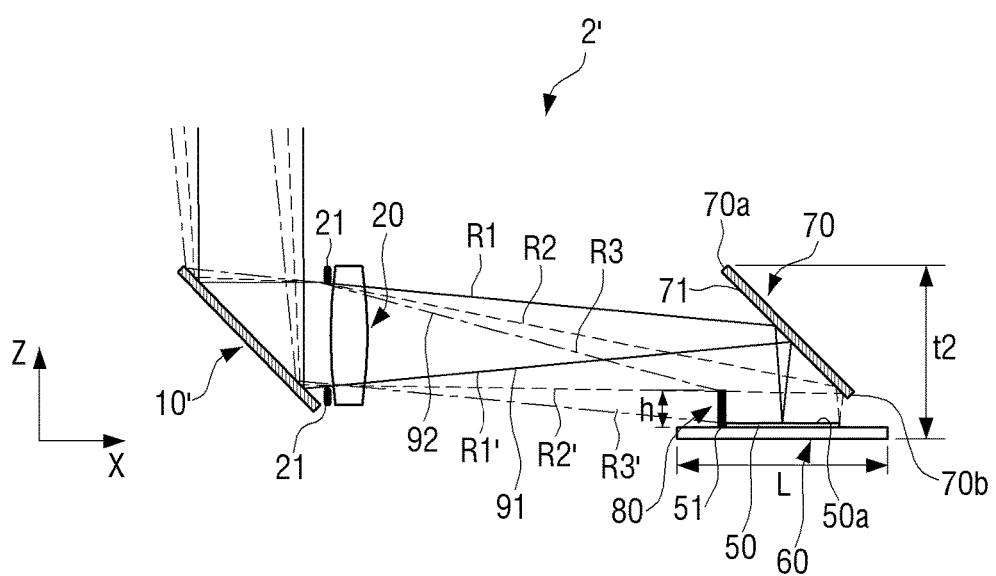
FIG. 6 is a diagram illustrating an example reflection type imaging apparatus according to another example embodiment of the present disclosure.

FIG. 6 is a diagram illustrating another example reflection type imaging apparatus according to another example embodiment of the present disclosure.

Referring to FIG. 6, the reflection type imaging apparatus 2' may include a deflector 10', a lens optical system 20, a reflecting mirror 70, an image sensor 50, and a stray light blocking member 80.

The deflector 10' is configured to deflect a path of light that is incident from the outside approximately 90 degrees, thereby reducing the height t2 of the reflection type imaging apparatus 2'. In the present example embodiment, a reflecting mirror 10' is used as the deflector.

In the reflection type imaging apparatus 2' according to the present example embodiment, the other structure except that the reflecting mirror 10' is used as the deflector is the same as that of the reflection type imaging apparatus 2 as described above; therefore, the detailed description thereof is omitted.

Hereinafter, a mobile device provided with a reflection type imaging apparatus according to an example embodiment of the present disclosure as described above will be described with reference to accompanying drawings.

In the following description, a smartphone is described as example of the mobile device. However, the mobile device is not limited thereto. The mobile device may include a mobile phone, a tablet computer, a notebook computer, a personal digital assistant (PDA), a personal multimedia player (PMP), an e-book terminal, and the like.

Figure 7:
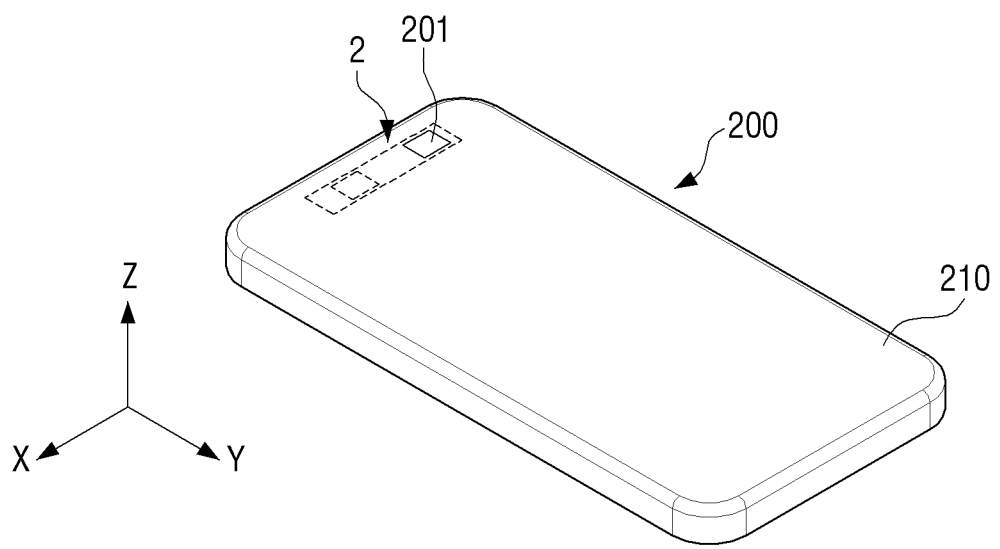
FIG. 7 is a perspective view illustrating an example mobile device provided with a reflection type imaging apparatus according to an example embodiment of the present disclosure.

FIG. 7 is a perspective view illustrating an example mobile device provided with a reflection type imaging apparatus according to an example embodiment of the present disclosure, and FIG. 8 is a functional block diagram of the mobile device of FIG. 7.

Referring to FIGS. 7 and 8, the mobile device 200 may include a case 210, a display portion (e.g., including a display panel) 230, a reflection type imaging apparatus 2, and an image processing unit (e.g., including image processing circuitry) 220.

The case 210 forms an appearance of the mobile device 200. The reflection type imaging apparatus 2 and the image processing unit 220 are disposed inside the case 210. A through hole 201 through which external light rays to be incident on the deflector 10 of the reflection type imaging apparatus 2 passes is provided in one side of the case 210. The through hole 201 may be provided with a transparent protection member such as glass, plastic, etc.

The display portion 230 may be provided on a front surface or a rear surface of the case 210. The display portion 230 may use a liquid crystal display (LCD) panel or an organic light emitting diode (OLED) panel, or the like. With reference to FIG. 7, since the display portion 230 is located on the bottom side of the mobile device 200, the display portion 230 is not shown.

The image processing unit 220 includes image processing circuitry that is configured to process an image of an object captured by the reflection type imaging apparatus 2, thereby outputting the image to the display portion 230 or saving the image in a memory 240 of the mobile device 200. The image processing unit 220 may be formed integrally with the image sensor 50 in the printed circuit board 60 on which the image sensor 50 is disposed. Alternatively, the image processing unit 220 may be formed integrally with a controller (not illustrated) for entirely controlling the mobile device 200.

The reflection type imaging apparatus 2 is disposed inside the case 210 of the mobile device 200. The deflector 10 of the reflection type imaging apparatus 2 is located below the through hole 201 of the case 210. In this example embodiment, the reflection type imaging apparatus 2 is disposed at one side of the mobile device 200.

The reflection type imaging apparatus 2 includes the deflector 10, the reflecting mirror 70, the image sensor 50, and a stray light blocking member 80.

The deflector 10 is disposed so that the incident surface 11 is located directly below the through hole 201 of the case 210. The reflecting mirror 70 is spaced apart by a predetermined distance from the deflector 10 in a width direction (X direction) of the mobile device 200. The image sensor 50 is disposed to face the reflecting surface 71 of the reflecting mirror 70. In detail, the light incident surface 50a of the image sensor 50 is disposed to form an acute angle with the reflecting surface 71 of the reflecting mirror 70.

The structure and function of each of the deflector 10, the reflecting mirror 70, the image sensor 50, and the stray light blocking member 80 of the reflection type imaging apparatus 2 are the same as described above. Therefore, detailed descriptions thereof are omitted.

Figure 9:
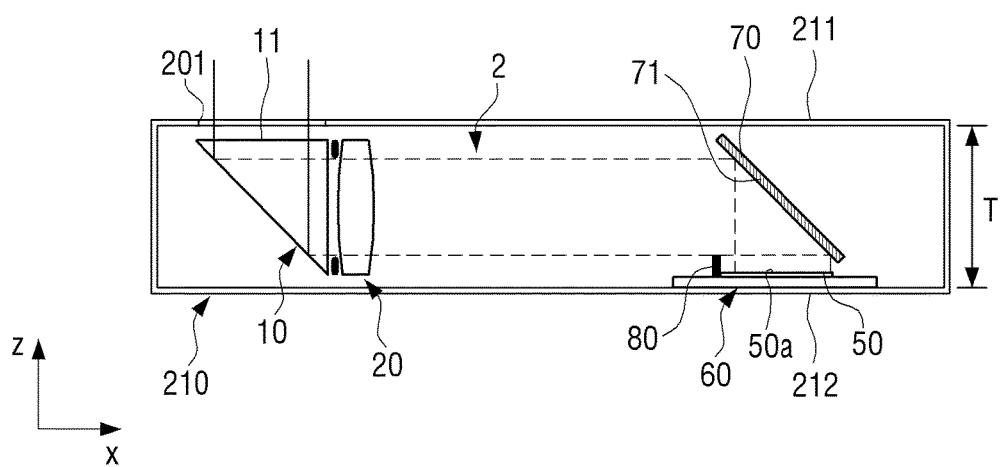
FIG. 9 is a cross-sectional view schematically illustrating an example reflection type imaging apparatus according to an example embodiment of the present disclosure provided in a mobile device.

The printed circuit board 60 on which the image sensor 50 is disposed, as illustrated in FIG. 9, may be disposed on an inner surface of the lower surface 212 facing the upper surface 211 of the case 210 on which the through hole 201 is formed. The upper surface 211 and the lower surface 212 of the case 210 are disposed parallel to each other. Further, the reflecting mirror 70 is disposed so that the reflecting surface 71 of the reflecting mirror 70 faces the lower surface 212 facing the upper surface 211 of the case 210 on which the through hole 201 is formed. FIG. 9 is a cross-sectional view schematically illustrating an example reflection type imaging apparatus according to an example embodiment of the present disclosure provided in a mobile device.

Figure 10:
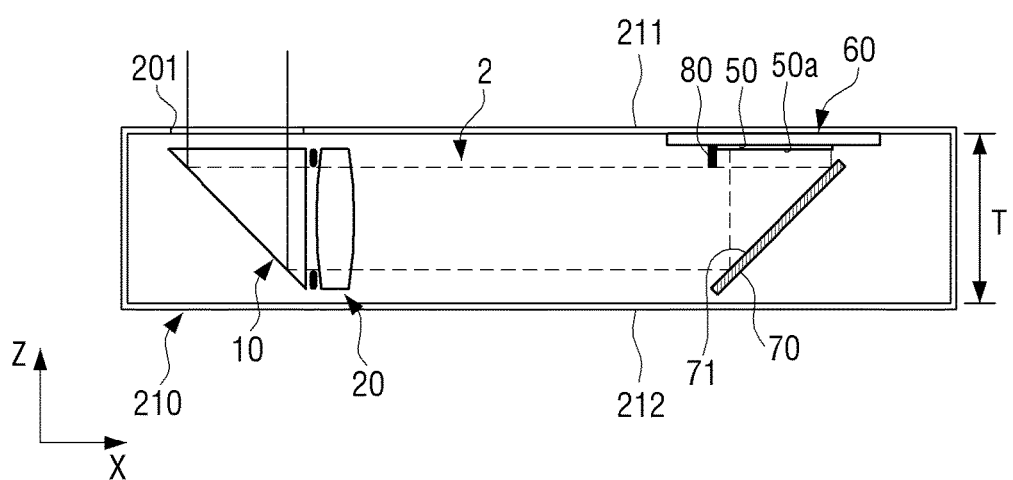
FIG. 10 is a cross-sectional view schematically illustrating another example reflection type imaging apparatus according to another example embodiment of the present disclosure provided in a mobile device.

As another example, as illustrated in FIG. 10, the printed circuit board 60 on which the image sensor 50 is provided may be disposed on an inner surface of the upper surface 211 of the case 210 on which the through hole 201 is formed. The upper surface 211 and the lower surface 212 of the case 210 are disposed parallel to each other. At this time, the reflecting mirror 70 is disposed so that the reflecting surface 71 of the reflecting mirror 70 faces the upper surface 211 of the case 210. FIG. 10 is a cross-sectional view schematically illustrating an example reflection type imaging apparatus according to another example embodiment of the present disclosure provided in a mobile device.

At this time, the stray light blocking member 80 disposed at one side of the image sensor 50 may block the stray light from being incident on the image sensor 50 regardless of the installation position of the image sensor 50.

With the reflection type imaging apparatus 2 according to an example embodiment of the present disclosure as described above, since the image sensor 50 may be disposed on the upper surface 211 or the lower surface 212 of the case 210 according to the internal structure of the mobile device 200, the degree of freedom in designing the internal structure of the mobile device 200 is high.

With the mobile device 200 provided with the reflection type imaging apparatus 2 according to an example embodiment of the present disclosure as described above, since the thickness of the reflection type imaging apparatus 2 can be smaller than the size of the image sensor 50, it is possible to reduce the thickness T of the mobile device 200.

With the mobile device 200 provided with the reflection type imaging apparatus 2 according to an example embodiment of the present disclosure as described above, since the image quality degradation due to the stray light can be prevented, the mobile device 200 may capture images having a good quality.

While various example embodiments of the present disclosure have been described, additional variations and modifications of the example embodiments may occur to those skilled in the art once they learn of the basic concepts. Therefore, it is intended that the appended claims shall be construed to include both the above embodiments and all such variations and modifications that fall within the spirit and scope of the disclosure.

What is claimed is:
1. A reflection type imaging apparatus comprising:
a deflector configured to reflect light incident from an outside;
a reflecting mirror configured to reflect the light reflected by the deflector in a direction parallel to a direction in which the light is incident on the deflector;
an image sensor arranged to be perpendicular to the direction in which the light is incident on the deflector, wherein the image sensor is supported by a circuit board and is configured so that light reflected by the reflecting mirror is focused on the image sensor; and
a stray light blocking member disposed immediately adjacent one side of the image sensor and facing the deflector, wherein a bottom of the stray light blocking member is supported by the circuit board, the stray light blocking member configured to block stray light rays from the deflector from being directly incident on the image sensor.

2. The reflection type imaging apparatus of claim 1, wherein the stray light blocking member is disposed in contact with a starting point of an effective area of the image sensor in a traveling direction of the light between the deflector and the reflecting mirror.

3. The reflection type imaging apparatus of claim 2, wherein a height of the stray light blocking member is based on a height of an intersection point of a first optical path through which a light ray, which is reflected by a lower end of the deflector, is incident on the reflecting mirror, is reflected by the reflecting mirror, and reaches an end point of the effective area of the image sensor, passes, and a second optical path through which the light ray, which is reflected by a top end of the deflector, and is incident on the effective area of the image sensor without being incident on the reflecting mirror, passes.

4. The reflection type imaging apparatus of claim 2, wherein the stray light blocking member is disposed on the circuit board which is a printed circuit board on which the image sensor is disposed.

5. The reflection type imaging apparatus of claim 1, wherein a light incident surface of the image sensor and a reflecting surface of the reflecting mirror form an acute angle.

6. The reflection type imaging apparatus of claim 5, wherein the effective area of the image sensor is smaller than a projected area of the reflecting surface of the reflecting mirror.

7. The reflection type imaging apparatus of claim 1, wherein the deflector comprises one of a prism and a reflecting mirror.

8. A mobile device comprising:
a display portion;
a reflection type imaging apparatus configured to photograph an object;
an image processing unit comprising image processing circuitry configured to process an image of the object photographed by the reflection type imaging apparatus and to output the image to the display portion; and
a case housing the display portion, the reflection type imaging apparatus, and the image processing unit,
wherein the reflection type imaging apparatus comprises:
a deflector that receives light reflected by the object and reflects the received light;
a reflecting mirror configured to reflect the light reflected by the deflector in a direction parallel to a direction in which the light is incident on the deflector;
an image sensor arranged to be perpendicular to the direction in which the light is incident on the deflector, wherein the image sensor is supported by a circuit board and is configured so that light reflected by the reflecting mirror is focused on the image sensor; and
a stray light blocking member disposed immediately adjacent one side of the image sensor facing the deflector, wherein the stray light blocking member is supported by the circuit board, the stray light blocking member configured to block stray light rays from the deflector from being directly incident on the image sensor.

9. The mobile device of claim 8, wherein the stray light blocking member is disposed in contact with a starting point of an effective area of the image sensor in a traveling direction of the light between the deflector and the reflecting mirror.

10. The mobile device of claim 9, wherein a height of the stray light blocking member is based on a height of an intersection point of a first optical path through which a light ray, which is reflected by a lower end of the deflector, is incident on the reflecting mirror, is reflected by the reflecting mirror, and reaches an end point of the effective area of the image sensor, passes, and a second optical path through which the light ray, which is reflected by a top end of the deflector, and is incident on the effective area of the image sensor without being incident on the reflecting mirror, passes.

11. The mobile device of claim 9, wherein the stray light blocking member is disposed on the circuit board which is a printed circuit board on which the image sensor is disposed.

12. The mobile device of claim 11, wherein the case comprises an upper surface and a lower surface parallel to each other;
the light is incident on the deflector through a through hole formed on the upper surface of the case, and
the printed circuit board is disposed on the lower surface of the case.

13. The mobile device of claim 11, wherein the case comprises an upper surface and a lower surface parallel to each other;
the light is incident on the deflector through a through hole formed on the upper surface of the case, and
the printed circuit board is disposed on the upper surface of the case.

14. The mobile device of claim 8, wherein the deflector comprises one of a prism and a reflecting mirror.

\* \* \* \* \*